US008589073B2

(12) United States Patent
Guha et al.

(10) Patent No.: US 8,589,073 B2
(45) Date of Patent: Nov. 19, 2013

(54) DISTRIBUTED TRAFFIC NAVIGATION USING VEHICULAR COMMUNICATION

(75) Inventors: Ratul K. Guha, Kendall Park, NJ (US); Wai Chen, Parsippany, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 556 days.

(21) Appl. No.: 12/646,277

(22) Filed: Dec. 23, 2009

(65) Prior Publication Data

US 2011/0035146 A1 Feb. 10, 2011

Related U.S. Application Data

(60) Provisional application No. 61/232,536, filed on Aug. 10, 2009, provisional application No. 61/232,538, filed on Aug. 10, 2009.

(51) Int. Cl.

*G08G 1/09* (2006.01)
*G01C 21/00* (2006.01)
*G01C 21/36* (2006.01)
*G01G 19/00* (2006.01)

(52) U.S. Cl.

USPC ........... 701/527; 701/117; 701/118; 701/414; 701/416; 701/420; 701/422; 701/423; 701/437; 701/537; 340/905

(58) Field of Classification Search

USPC ......... 701/117, 118, 119, 301, 342, 414, 416, 701/420, 437, 553, 517, 532, 201, 422, 701/423; 340/902, 905, 990, 992; 370/229, 370/238, 315, 342, 392

See application file for complete search history.

(56) References Cited

U.S. PATENT DOCUMENTS

| | | | | |
|---|---|---|---|---|
| 5,610,821 | A * | 3/1997 | Gazis et al. | 455/456.5 |
| 7,280,545 | B1 * | 10/2007 | Nagle | 370/400 |
| 8,108,141 | B2 * | 1/2012 | Ehrlacher | 701/416 |
| 2004/0073361 | A1 * | 4/2004 | Tzamaloukas et al. | 701/210 |
| 2004/0148090 | A1 * | 7/2004 | Melen | 701/200 |
| 2006/0031003 | A1 * | 2/2006 | Sun et al. | 701/117 |
| 2007/0115868 | A1 * | 5/2007 | Chen et al. | 370/315 |
| 2007/0135990 | A1 * | 6/2007 | Seymour et al. | 701/117 |
| 2007/0168118 | A1 * | 7/2007 | Lappe et al. | 701/207 |

(Continued)

OTHER PUBLICATIONS

Patent Cooperation Treaty International Search Report, Oct. 1, 2010.

(Continued)

*Primary Examiner* — Tuan C. To
*Assistant Examiner* — Kevin P Mahne
(74) *Attorney, Agent, or Firm* — Philip J. Feig

(57) ABSTRACT

A method for distributed traffic navigation in a vehicular network is presented. At each vehicle entering the network, information associated with the vehicular network is acquired and stored, and destination addresses are broadcasted as route requests. At each vehicle in the network, the stored information is updated through vehicle to vehicle communication. At each junction, a header vehicle is selected for listening for broadcasts to determine the presence of a matrix. If the matrix is not present, the matrix is initialized based on the stored information of the header vehicle. The header vehicle further estimates travel time on the road segments based on the matrix, calculates a backlog indicator based on the segment travel time and the route requests. The header vehicle further updates the matrix and generates a route based on the matrix. The matrix is broadcasted from the header vehicle.

14 Claims, 6 Drawing Sheets

(56) References Cited

U.S. PATENT DOCUMENTS

| | | | | |
|---|---|---|---|---|
| 2007/0299571 | A1* | 12/2007 | Laberteaux et al. | 701/24 |
| 2008/0046173 | A1* | 2/2008 | Lappe et al. | 701/209 |
| 2008/0095134 | A1* | 4/2008 | Chen et al. | 370/342 |
| 2009/0030605 | A1* | 1/2009 | Breed | 701/208 |
| 2009/0048750 | A1* | 2/2009 | Breed | 701/70 |
| 2009/0105942 | A1* | 4/2009 | Lin et al. | 701/202 |
| 2010/0057346 | A1* | 3/2010 | Ehrlacher | 701/202 |
| 2010/0268445 | A1* | 10/2010 | Chen et al. | 701/119 |
| 2011/0310733 | A1* | 12/2011 | Tzamaloukas et al. | 370/230 |
| 2012/0253661 | A1* | 10/2012 | Tuukkanen | 701/423 |

OTHER PUBLICATIONS

Inoue, S. et al., "An Automobile Control Method for Alleviation of Traffic Congestions Using Inter-Vehicle . . . " Graduate School of Information Hiroshima University Japan, Nov. 2007.

Collins, K. et al., "TraffCon: An-Intelligent Traffic Control System for Wireless Vehicular Networks" School of Electonic Engineering, Dublin City University, Ireland, Jan. 2007.

Guha, R.K. et al., "A Distributed Traffic Routing System Using . . . " IEEE Vehicular Networking Conference (VNC), Tokyo, Japan, Oct. 2009.

"Interchange (road)" Wikipedia, the free encyclopedia http://en.wikipedia.org/wiki/Interchange_(road) Retrieved Dec. 10, 2009.

* cited by examiner

FIG. 6

INTERSECTION k $$\epsilon_n^{r,k} = \begin{cases} 1 \text{ IF } \Sigma_{j\in V}\, x_{kj}^{n,r} + g_k^r > \Sigma_{j\in V}\, x_{jk}^{n,r} + f_k^r, \\ 0 \text{ IF } \Sigma_{j\in V}\, x_{kj}^{n,r} + g_k^r = \Sigma_{j\in V}\, x_{jk}^{n,r} + f_k^r, \\ -1 \text{ IF } \Sigma_{j\in V}\, x_{kj}^{n,r} + g_k^r < \Sigma_{j\in V}\, x_{jk}^{n,r} + f_k^r. \end{cases}$$

$$\alpha_n^{k,j} = \begin{cases} 0 \text{ IF } \Sigma_r x_{kj}^{n,r} \leq C_{kj}, \\ 1 \text{ IF } \Sigma_r x_{kj}^{n,r} > C_{kj}. \end{cases}$$

UPDATE AT INTERSECTION k $$x_{kj}^{n+1,r} = \left[ x_{kj}^{n,r} - \frac{1}{n} \left(\gamma(\epsilon_n^{r,k} - \epsilon_n^{r,j} + \alpha_n^{k,j}) + D'_{kj}(\Sigma_r x_{kj}^{n,r})\right)\right]_+$$

FIG. 7

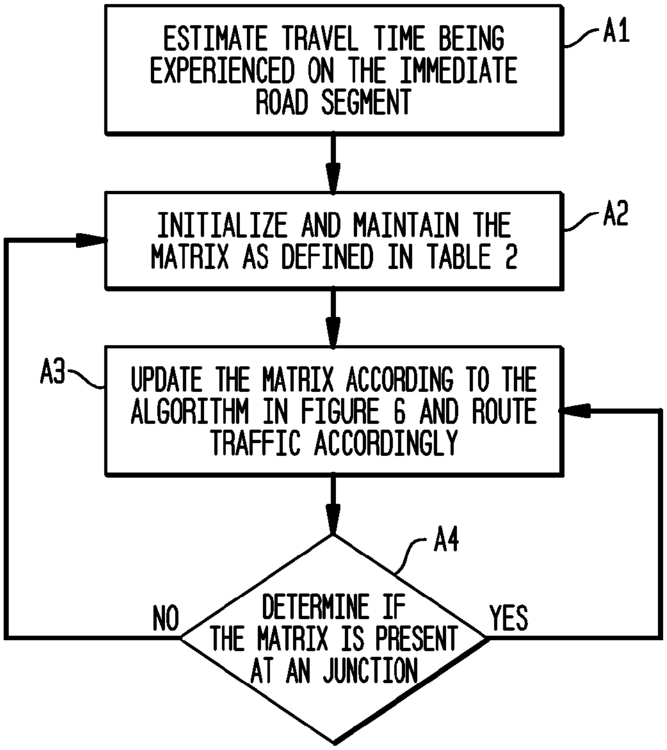

DISTRIBUTED TRAFFIC NAVIGATION USING VEHICULAR COMMUNICATION

CROSS REFERENCE TO RELATED APPLICATIONS

The present invention claims the benefit of U.S. provisional patent applications 61/232,536 and 61/232,538, both filed Aug. 10, 2009, the entire contents and disclosure of which are incorporated herein by reference as if fully set forth herein.

FIELD OF THE INVENTION

The present invention relates generally to automotive telematics, such as vehicle to vehicle communication, personal navigation, eco-friendly routing and traffic congestion avoidance. In particular, the invention relates to a distributed traffic navigation system and method independent of a central unit.

BACKGROUND OF THE INVENTION

Vehicular traffic congestion leads to significant cost in terms of time, money and influence on the environment. To alleviate the effect through situational awareness, various traffic service providers, such as Navteq®, Inrix® and Total Traffic®, provide traffic and route information to the drivers. These information providers rely on a host of sensors, GPS probes, tollbooth data, Bluetooth sensors and so on, to collect information. The collected information is processed through proprietary methods and presented to the subscribers.

FIG. 1 illustrates an architectural diagram of a traditional infrastructure-based traffic information system 100 for implementing route calculation taking into account congestion information. The system 100 includes a data acquisition layer 102, for collecting traffic data from road sensors, cameras, probes and the like. The collected data can be related to accidents, roadwork and so on. The collected data are aggregated and processed in a traffic aggregation layer 104 including a central unit, which can be provided by service providers, such as Navteq®, Inrix® and so on. The central unit performs various functions, including the function of calculating reduced travel time routes for the vehicles on the roadways.

The data processed by the traffic aggregation layer 104 is subsequently distributed through a wireless distribution layer 106, which for example is implemented by FM or Satellite Radio. The information related to traffic congestion is fed to device layer 108 including in-vehicle navigation devices, smart phones or mobile phones, for conveying traffic information to drivers.

However, for the existing traffic navigation systems, the traffic information is limited to main roads. Thus, information related to the spillage onto arterial and side roads is barely available. This limits the ability to suggest alternate routes under most circumstances. Even on the major roads, the time to collect the information and send it to the users is significant. Various attempts are used to fit statistical distributions to the collected data. However, the accuracy, especially within short time frames (for example, a few minutes), suffers.

Lack of information about the state of the sensors also poses significant challenges for the traffic information aggregation. This is a result of lack of information about the status of GPS probes, their densities and other local conditions such as accidents, poor weather, road conditions, parking, short term congestion and so on. This significantly limits the ability of traffic information services to be responsive to the dynamic changes in the roadway environment.

Moreover, due to the centralized collection of all traffic-related data, it is extremely difficult to gather data from all the arterial and local roads for purposes such as route computation, which results in route computation based only on the starting conditions and very limited adaptation to altering traffic loads on different roads or road segments.

Accordingly, it is desirable to provide a distributed vehicle traffic navigation system and method which leverage a multi-hop vehicular network to gather local information and locally determine the shortest time travel paths independent of a central unit.

Further, it is desirable to provide a distributed vehicle traffic data management system and method which rely on distributed information aggregation of probe data and/or sensor data to build roadway traffic awareness and complement the services from traffic information providers.

SUMMARY OF THE INVENTION

According to one aspect of the present invention, a method for distributed traffic navigation in a vehicular network is provided. The vehicular network comprises a plurality of road segments connected through a plurality of road junctions, and a plurality of vehicles operating on the road segments. The method comprises, at each vehicle entering the network, acquiring and storing information associated with the vehicular network, generating a destination address, and broadcasting the destination address as a route request. The method further comprises, at each vehicle in the network, updating the stored information through communication with at least one communicable vehicle. The method further comprises, at each junction, selecting a header vehicle, the header vehicle listening for broadcasts to determine the presence of a matrix, the header vehicle initializing the matrix based on the stored information of the header vehicle when the matrix is not present, the header vehicle estimating travel time on the road segments based on the matrix, the header vehicle computing a backlog indicator based on the travel time and the route request, the header vehicle updating the matrix based on the backlog indicator, the header vehicle generating a route based on the matrix, and the header vehicle broadcasting the matrix.

A program storage device, such as computer readable medium, readable by a machine, tangibly embodying a program of instructions executable by the machine to perform methods described herein may also be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 6 illustrates a distributed algorithm to update a matrix;

FIG. 7 illustrates a high-level flow diagram of a distributed vehicle traffic navigation method.

DETAILED DESCRIPTION

The present invention advantageously provides a distributed vehicle traffic navigation system and method for calculating routes with minimum travel time for vehicles on roadways.

Figure 1:
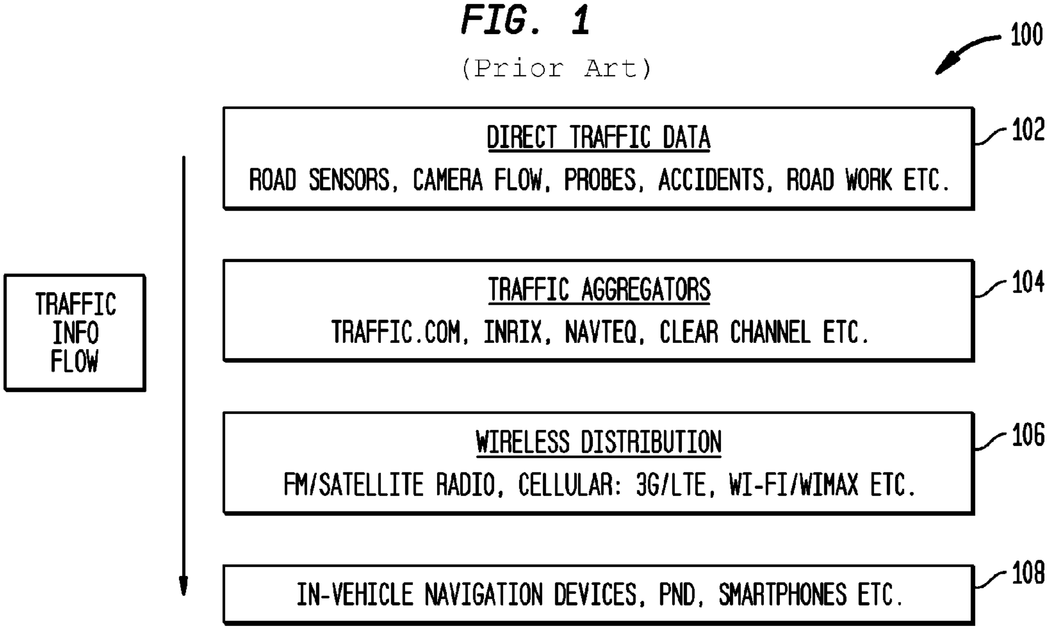
FIG. 1 (Prior Art)
FIG. 1 illustrates an architectural diagram of a traditional infrastructure-based traffic navigation system.
Figure 2:
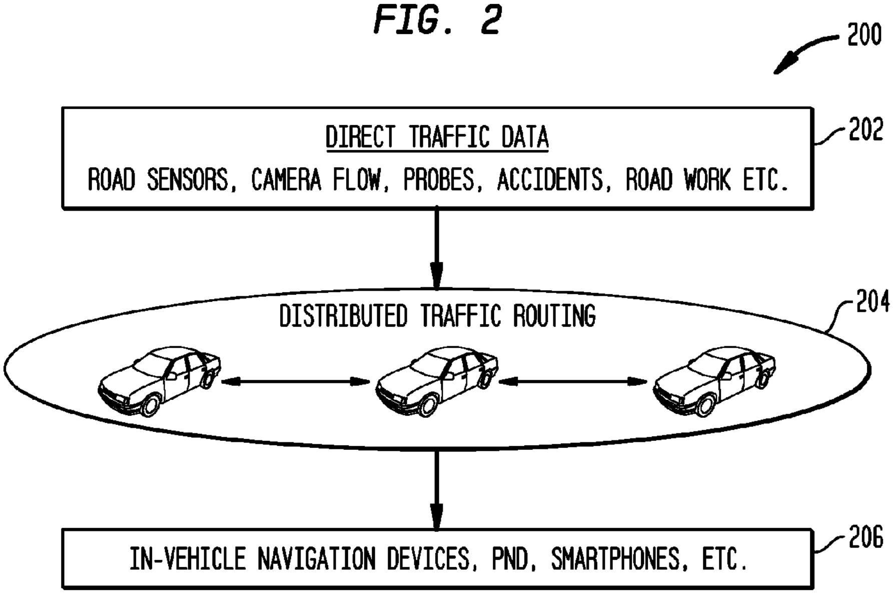
FIG. 2 illustrates an architectural diagram of a distributed vehicle traffic navigation system through vehicle to vehicle communication.

FIG. 2 illustrates an architectural diagram of a distributed vehicle traffic navigation system 200 through vehicle to vehicle communication, according to an exemplary embodiment of the present invention. The system 200 includes a data acquisition layer 202 for collecting traffic data from road sensors, cameras, probes and the like. The collected data can be related to accidents, roadwork and so on. The system 200 further includes a distributed traffic data routing layer 204, in which the traffic data is communicated and exchanged between vehicles, without incurring centralized aggregation of all traffic-related data. In this manner, local information can be acquired to enhance the ability of the system to manage and navigate traffic data. The device layer 206 includes in-vehicle navigation devices, such as smart phones, mobile phones and so on, for conveying traffic information to a driver.

Figure 3:
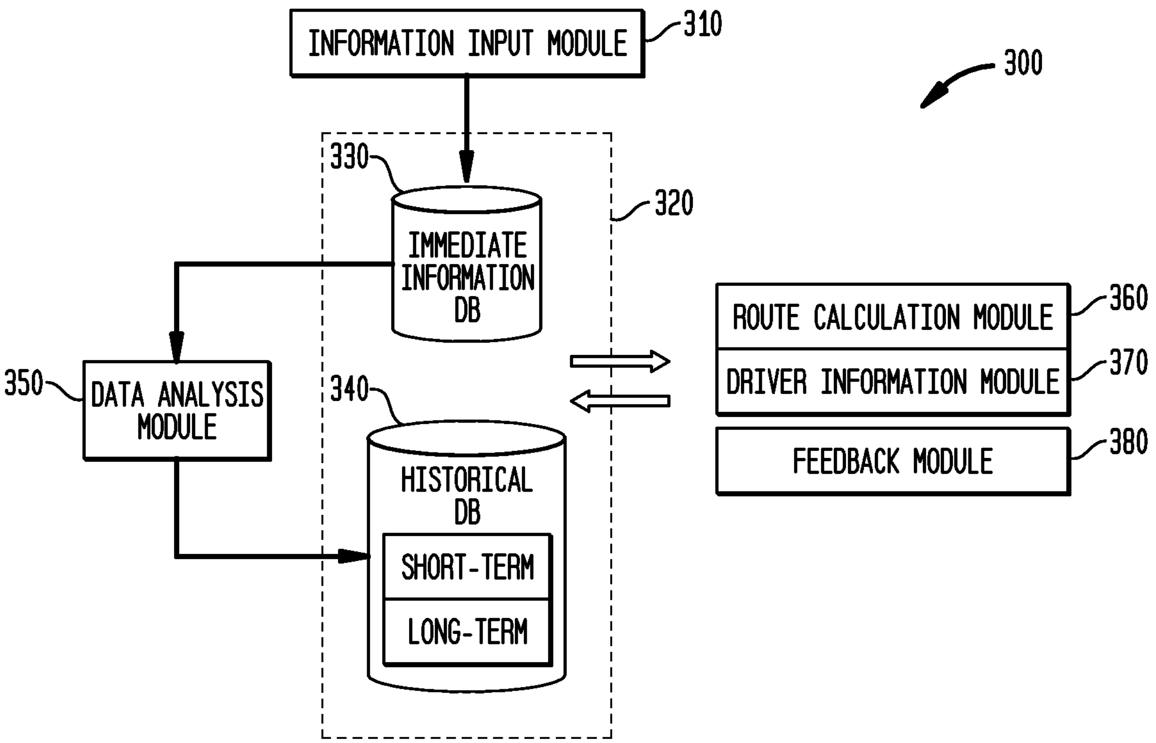
FIG. 3 illustrates a high-level functional block diagram of a distributed vehicle traffic data management system.

FIG. 3 illustrates a high-level functional block diagram of a distributed vehicle traffic data management system 300, according to an aspect of the present invention. Specifically, the operations performed at each vehicle support a distributed data management scheme. In FIG. 3, the block arrows denote information flow, queries, event triggers and so on; and the line arrows denote information flow.

At a high level, the system 300 includes an information input module 310, an information storage module 320 (including a short term or immediate database 330 and a historical database 340), a data analysis module 350, a route calculation module 360, a driver information module 370 and a feedback module 380.

The information input module 310 includes an array of sensors, driver preferences, information obtained from other vehicles passively, information obtained from other vehicles via a lookup table and so on. The short term or immediate information database 330 stores the currently obtained information, the information being analyzed, and time sensitive information in the order of seconds or minutes. This may include, for example, the current estimate of the travel time on road segments and the like. The historical database 340 stores the information, which is trusted and relatively stable. The short term information may include nominal congestion profiles, event updates, road conditions that alter over days to weeks. The long term information may include road maps, construction work and the like, that alter over months.

The data analysis module 350 performs the following functions. The data analysis module 350 categorizes information based on time sensitivity, and generates and updates averaged values for storage in the historical database 340. The data analysis module 350 performs a statistical analysis of information, including, for example, evaluation of congestion levels, elimination of outliers such as those deviating significantly from nominal traffic profiles and so on.

The route calculation module 360 performs the function of calculating an optimal route for a vehicle based on traffic data, such as information relating to traffic congestion profiles, neighboring vehicle routes, information relating to short term aggregated congestion and so on. The driver information module 370 performs the function of providing information to drivers for roadway awareness. For example, the drivers can request information retrieved from a loop-up table through the driver information module 370. The feedback module 380 performs the function of updating the stored information based on driver's observation, driver's preferences, and other inputs.

The following Table 1 shows a sample information database at a vehicle.

TABLE 1

| Info | Lat/Lon | Region | Time | Heading/Speed | Other |
|---|---|---|---|---|---|
| A | | | | | |
| B | | | | | |
| C | | | | | |

The database can be, for example, in the form of a table, wherein each row corresponds to an information attribute named A, B and C, respectively. In each row, ancillary information, such as position, region, time and so on, is stored. The table is updated instantly or in real time, when new traffic data is available, such as information relating to traffic, road condition, parking, potholes, safety, events and so on.

However, a person of ordinary skill in the art should understand that various other information attributes can be compiled into the table for achieving a more complex database and the database can also be implemented in different storage formats, without deviating from the spirit of the present invention.

According to the exemplary embodiment described above, the traffic data management system 300 utilizes scattered pieces of information present on the roadway to provide meaningful information to the driver. Since the information is not aggregated and processed at a central location before it is available to the drivers, the timeliness and accuracy of the data exchanged between the vehicles can be improved significantly, which in turn results in prompt response and flexible adaptation. Furthermore, without the geographical and logical restraints of the central unit, near term and short range information can be provided to the drivers.

As compared to the traditional infrastructure-based systems, the distributed data aggregation achieved by the traffic data management system 300 according to the present invention can effectively improve the information quality available from traffic networks. For example, for the application of vehicle traffic congestion prediction, commercially available service providers, such as Navteq®, Inrix® and Total Traffic®, use road sensors, toll collection and so on to gather distributions of vehicles. However, translating from point density of vehicles to segment occupancy remains a challenging task without access to vehicle level length and driving behavior information. Thus, the application of vehicle traffic congestion prediction provided by the existing service providers remains unsatisfactory. Since the vehicle level length and driving behavior information can be accessed by the distributed data management system of the present invention in a small-scale region, much more accurate predictions can be realized.

Furthermore, the traffic data management system 300 can be not only used independently to achieve efficient data communication between vehicles, but also can be used compatibly with existing traffic-based navigation systems to enhance and enrich the functionalities of the existing system, such that the existing systems can be complemented by providing the drivers with access to dynamic roadway information.

In addition, the system has the capability to look up information in an on-demand fashion, which provides the drivers access to information that may not be available at the back-end server infrastructure, and enables access of near term and short range information to drivers.

The system model used for generating a minimum travel time route for a vehicle and to dynamically update the travel route is defined as follows.

Figure 4A:
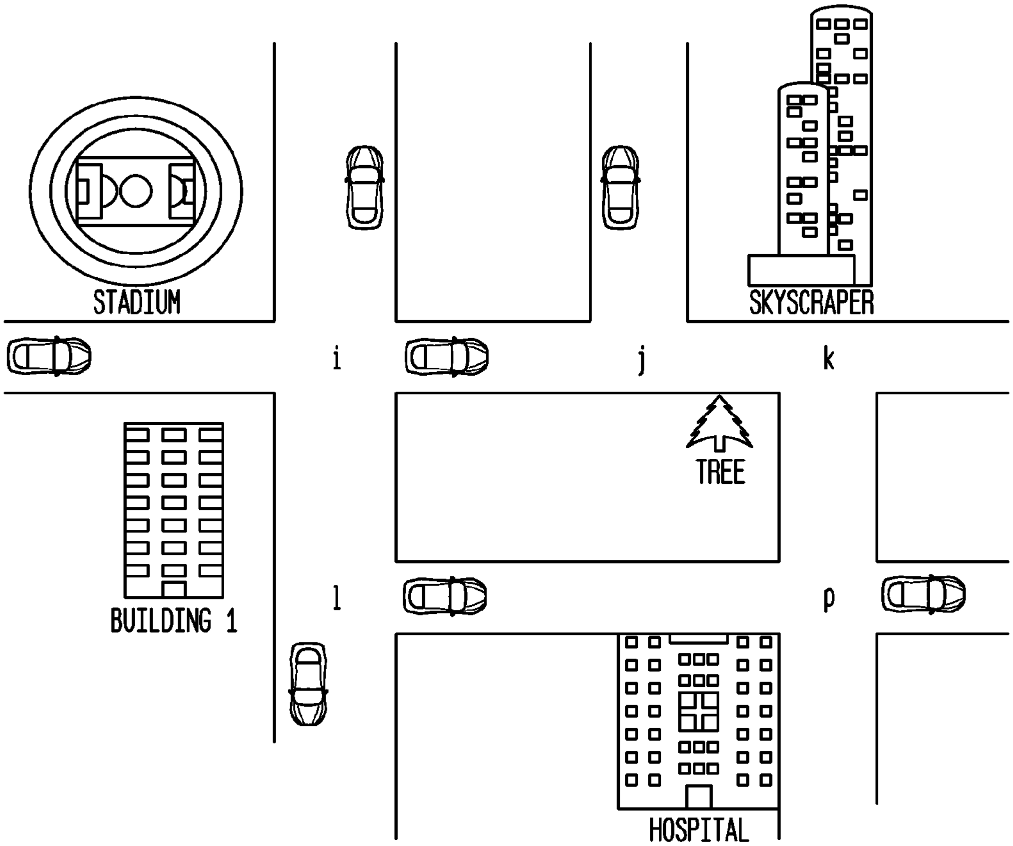
FIG. 4(*a*) illustrates a representation of a vehicular network and FIG. 4(*b*) illustrates a modeled graph of the network shown in FIG. 4(*a*), with the junctions as nodes and the road segments as edges.
Figure 4B:
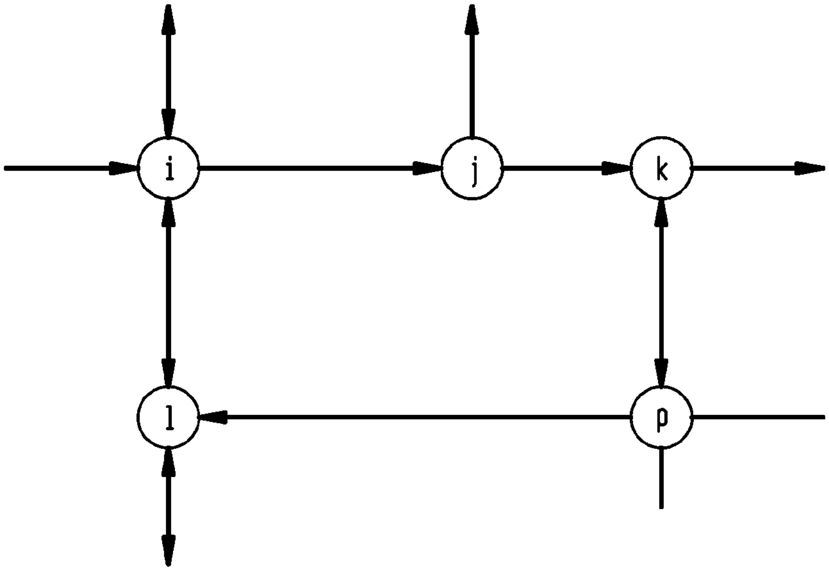

FIG. 4(*a*) illustrates a representation of a vehicular network as a graph, and FIG. 4(*b*) illustrates a modeled graph of the network shown in FIG. 4(*a*). In FIGS. 4(*a*) and 4(*b*), the road segments are shown as edges and the road segments are connected through a plurality of junctions, such as intersections and/or interchanges, which are shown as nodes. The vehicular network of the present invention includes the road segments connected through junctions and the vehicles operating on the road segments. The direction of the edges shown in FIGS. 4(*a*) and 4(*b*) is the direction of vehicles on the street (one-way or two-ways). For considering bigger areas such as inter-city travel, a geographical region can also be treated as a vertex with major roads deemed to be edges. The term junction includes, for example, road intersections (including but not limited to stop signs and traffic lights) and road interchanges for highway (including but not limited to ramps, bridges and so on). The junctions are indexed by i and j and ij denotes the road between i and j.

For each road segment ij, we define certain local parameters.

Let:

$D_{ij}$ denote the travel time experienced on road segment ij; and $C_{ij}$ represents the maximum number of vehicles on road segment ij per unit time.

$C_{ij}$ can be dependent on road lengths, number of lanes, speed limits, safe following distances and so on. $D_{ij}$ depends on the number of vehicles entering the road segment, the road lengths, number of lanes, speed limits, safe following distances and so on. Length of cars is an additional parameter that can be leveraged to accurately translate from point densities to segment occupancy. The availability of such local information enhances the attractiveness of using a vehicle communication system to complement services from existing traffic information sources.

Moreover, the traffic and road conditions on each road segment can change rapidly with time, which are not reflected in paths suggested by known traffic information services. The system and method according to the present invention address this issue by dynamically computing from neighborhood information using a distributed algorithm, so as to ensure that the travel time is minimized while capturing the effect of altering roadway conditions and inter-dependence between the decisions at different vehicles.

Figure 5:
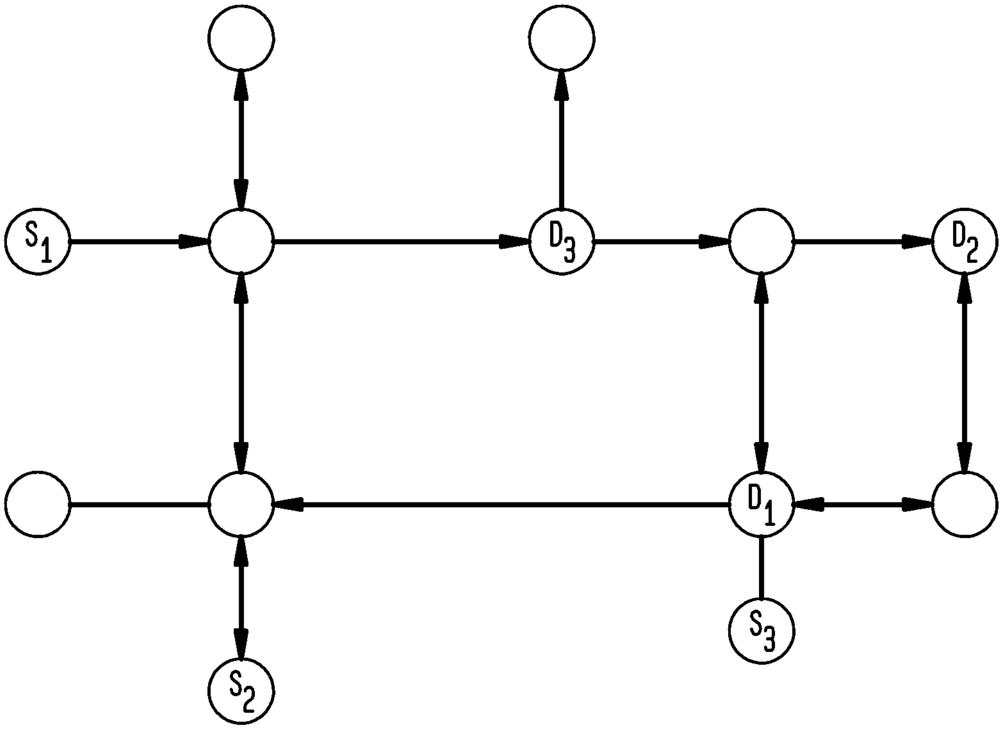
FIG. 5 illustrates a modeled graph showing the different traffic flows through the road network.

FIG. 5 illustrates a modeled graph showing the different traffic flows through the vehicular network. In FIG. 5, nodes $S_1$, $S_2$, and $S_3$ denote starting points of vehicles, that is, points at which vehicles enter the road network; and nodes $D_1$, $D_2$, and $D_3$ denote destination points of vehicles, that is, points at which the system assumes that the vehicles leave the road network. Numerous vehicles with different starting points and destination points travel through the network. The possibility of a vehicle of going through any given road segment depends on a number of factors such as intended destination, vehicle density, posted speed limit, current speeds and so on.

Table 2 shows a matrix maintained and updated at each junction by vehicles.

TABLE 2

| | Des | | | Segment | Maximum |
|---|---|---|---|---|---|
| $X_{ij}$ | 1 | 2 | 3 | time (secs) | Capacity |
| A | 0.6 | 0.5 | 0 | | |
| B | 0 | 0.6 | — | | |
| C | 0.3 | — | 0.2 | | |
| D | 0 | 1.2 | 0.6 | | |

In Table 2, 'Des' denotes the destination numbered as 1, 2 and 3. Each row corresponds to a neighboring junction with names A, B, C and D. For example, consider the vehicles at current junction and headed to destination 2. The entry at B,2 (0.6) indicates the number of vehicles that should go towards junction B per unit time. This rate at the junction can be controlled based on local polling.

The segment time and the capacity are the estimates of the parameters for the outgoing road segments. This matrix is updated at every iteration asynchronously.

FIG. 6 illustrates a distributed algorithm to update the matrix shown in Table 2. In the algorithm shown in FIG. 6, $X_{kj}^r$ denotes variables that determine the number of vehicles at junction k that are intended for destination r and entering roadway kj per unit time. $\epsilon$ is calculated based on the incoming and the outgoing traffic. $\alpha$ is calculated based on the total vehicles per unit time on each road segment and can be calculated at the junction. $f_k^r$ is the rate at which new vehicles arrive at junction k and head to destination r. $g_k^r$ is the rate at which vehicles at junction k reach their destination r.

Accordingly, $g_k^r=0$ when k≠. Both $f_k^r$ and $g_k^r$ are locally known. $C_{kj}$ represents the maximum number of vehicles per unit time at roadway kj so as to ensure a minimum speed level. $C_{kj}$ can be a function of road lengths, number of lanes, safe following distances and so on. $D_{kj}$ represents the current estimate of the time to travel from k to j and is a function of the vehicles entering the road segment as well as road lengths, number of lanes, road conditions and so on. $D'_{kj}$ denotes the derivative of the travel time function with respect to the traffic flow rates. $\gamma$ can be an arbitrary number larger than the minimum derivative of the travel time. At points where the function is non-differentiable, the assumption holds for the sub-gradients.

The variable $x^{n,r}_{ij}$ is the value of $x_{ij}^r$ at the n-th iteration. $[\cdot]+$ denotes the projection on $[0,\infty)$. At points where $D'_{kj}$ is non-differentiable, the sub-gradient is used instead. The iterative computation is only performed at junctions by vehicles currently at the junctions. In iteration n, a backlog indicator $\epsilon_n^{r,k}$ is calculated at the junctions. The indicator can be represented using only two bits and needs to be communicated only to neighboring junctions though vehicle forwarding. Based on current congestion estimate on an outgoing road segment, a single bit congestion indicator $a_n^{kj}$ is computed at the junctions.

It is important to note that the computation can be done asynchronously at different junction vehicles and this eliminates the need for time synchronization. Moreover, the computation is dependent only on local information that can be gathered through vehicle to vehicle communication.

The protocol steps are as follows.

At Vehicles entering system

1) Broadcast destination address periodically as route requests.

At Vehicles at destination

1) Broadcast exit message before leaving system.

At Vehicles near/at Junctions

1) Vehicles know the junction location through onboard maps and GPS information.
2) A vehicle is selected as Header Vehicle (HV), for example, based on a random countdown timer and vehicle ID.
3) Listen for junction matrix broadcast. If broadcast is not received, HV initializes matrix and estimates travel time experienced on outgoing road segments. Maintain route requests.
4) HV computes backlog based on travel time experienced and current route requests from all vehicles.
5) Update matrix according to the distributed algorithm shown in FIG. 6.
6) HV chooses routes and assigns routes to the neighboring vehicles based on the rates in the matrix.
7) HV broadcasts the matrix at periodic intervals until it arrives at the next destination.

FIG. 7 is a high-level flow diagram of the inventive method. In step A1, rates for the outgoing road segments are computed through vehicle to vehicle messages. In addition, vehicles send back the travel time towards the previous junction leading to knowledge of the flow rates, which results in estimation of changing travel time experienced at each outgoing road segment. In step A2, any vehicle in the junction can be randomly chosen to maintain and update the matrix. The vehicle transfers the matrix to another vehicle while leaving the junction. The initialization in this step can be performed based on regular path information provided by navigation devices, which will significantly accelerate the convergence. Furthermore, route computation in a hierarchical manner based on sectors significantly reduces the state information that is maintained in the matrix, i.e., each sector may include of a set of collocated junctions. In step A3, the matrix is updated in accordance with the distributed algorithm shown in FIG. 6, and an optimal travel route is chosen based on the contents of the matrix. In step A4, it is determined whether a matrix is present at a different junction (such as a next junction). If the matrix is present, the process goes to step A3, for updating the matrix; otherwise, the process goes to step A2, for initializing the matrix.

Figure 8:
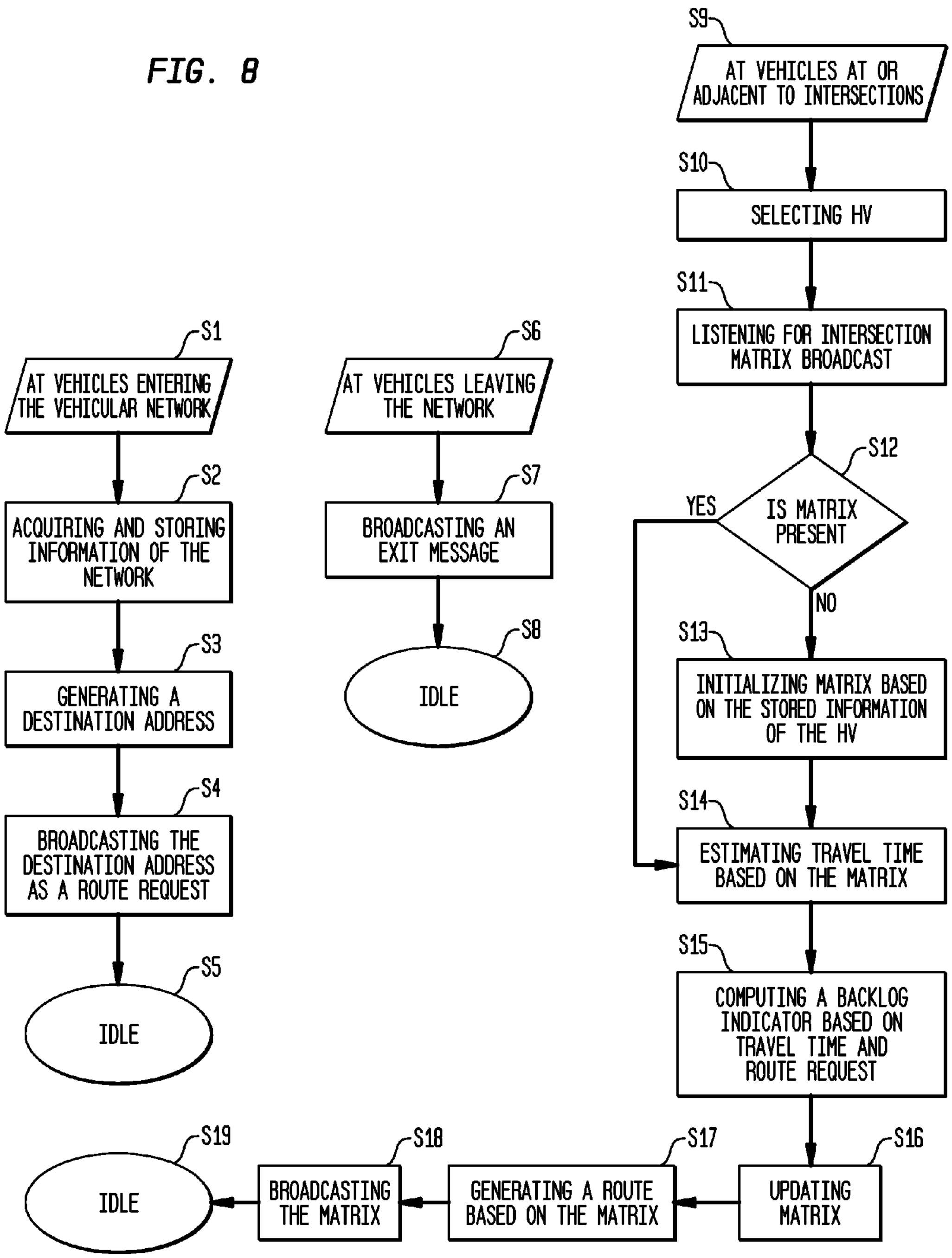
FIG. 8 illustrates a detailed flow diagram of the distributed vehicle traffic navigation method shown in FIG. 7.

FIG. 8 is a flow diagram showing the detailed steps according to the inventive method. At vehicles entering the vehicular network, data is available to send in step S1. In step S2, the vehicles acquire and store information associated with the vehicular network, including but not limited to traffic volume and congestion level of the vehicular network and the like. A destination address is generated by the entering vehicles in step S3, and the destination address is subsequently broadcasted in step S4 as a route request. In step S5, the vehicles entering the road network wait for addition data from an application.

Optionally, at vehicles at destinations and considered to be leaving the system, data is available to send in step S6. In step S7, the vehicles leaving the system broadcast an exit message. In step S8, the vehicle leaving the system waits for additional data from an application.

At vehicles at the junctions, data is available to send in step S9. At junction vehicles, multiple and distributed tasks are performed, wherein each vehicle at the junctions obtains its location, through onboard map and GPS information. Other methods of determining a vehicle location can also be used. In step S10, a vehicle is selected as Header Vehicle (HV). The selection can be performed based on a random countdown timer and vehicle ID. Other methods of selection can also be used. In step S11, the HV listens for broadcasts with matrix. If it is determined in step S12 that a broadcast is not received, that is, a matrix is not present (S12=NO), the matrix is initialized in step S13. Subsequently, in step S14, the HV estimates the travel time on the road segments based on the matrix. If the broadcast is received, that is, a matrix is present (S12=YES), the process goes to step S14.

In step S15, the HV computes a backlog indicator based on the travel time experienced on the road segments and the route requests. In step S16, the HV updates the matrix according to the distributed algorithm shown in FIG. 6, considering the backlog indicator.

In step S17, an optimal travel route is generated by the HV based on the contents of the matrix and the route is assigned to the neighboring vehicles. In step S18, the HV broadcasts the matrix at periodic intervals until the HV arrives at the next junction.

The present invention provides a benefit of enabling route computation that dynamically updates based on conditions in different road segments. The method leverages vehicle to vehicle communication to achieve limited dissemination of congestion information in a local neighborhood. In congested situations, vehicle to vehicle communication performs well owing to availability of forwarding vehicles. In situations where vehicles are sparse, vehicle to vehicle forwarding gets deficient, however congestion gets alleviated automatically. Hence, vehicle to vehicle communication becomes a natural choice for disseminating congestion information.

Prior solutions aggregate all information at a central location for route computation. This results in slow response and lack of route adaptation. Moreover due to higher traffic congestion, a large number of requests may be generated and such systems may perform poorly due to the heavy load on the network infrastructure.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some “functionality”, which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for distributed traffic navigation in a vehicular network, the vehicular networking comprising a plurality of road segments connected through a plurality of road junctions and a plurality of vehicles operating on the road segments, the method comprising steps of:

at each vehicle entering the vehicular network:

acquiring and storing information associated with the vehicular network;

generating a destination address; and broadcasting the destination address as a route request;

at each vehicle in the vehicular network:

updating the stored information through communication with at least one communicable vehicle; and at each junction:

selecting a header vehicle;

the header vehicle listening for broadcasts to determine the presence of an existing matrix;

the header vehicle initializing a new matrix based on the stored information of the header vehicle, when the existing matrix is not present;

the header vehicle estimating travel time on the road segments based on the new matrix when the existing matrix is not present or based on the existing matrix when the existing matrix is present;

the header vehicle computing a backlog indicator based on the travel time on the road segments and each route request from all vehicles;

the header vehicle updating the new matrix when the existing matrix is not present or updating the existing matrix when the existing matrix is present, wherein the updating is based on the backlog indicator;

the header vehicle generating a route and assigning a route to neighboring vehicles based on the updated matrix; and the header vehicle broadcasting the updated matrix.

2. The method according to claim 1, further comprising assigning the route to at least one neighboring vehicle.

3. The method according to claim 1, further comprising obtaining data associated with a location of the junction at each junction.

4. The method according to claim 1, wherein the step of selecting is performed based on a random countdown timer and a vehicle ID.

5. The method according to claim 1, wherein the step of broadcasting the destination address as a route request is performed periodically.

6. The method according to claim 1, wherein the step of broadcasting the updated matrix at the header vehicle is performed at periodic intervals until the header vehicle arrives at a different junction.

7. The method according to claim 1, further comprising: at each vehicle leaving the vehicular network, broadcasting an exit message.

8. A computer readable medium having a computer readable program for operating on a computer system for distributed traffic navigation in a vehicular network, the vehicular networking comprising a plurality of road segments connected through a plurality of road junctions and a plurality of vehicles operating on the road segments, the program comprising instructions that cause the computer system to perform the steps of:

at each vehicle entering the vehicular network:

acquiring and storing information associated with the vehicular network;

generating a destination address; and broadcasting the destination address as a route request;

at each vehicle in the vehicular network:

updating the stored information through communication with at least one communicable vehicle; and at each junction:

selecting a header vehicle;

the header vehicle listening for broadcasts to determine the presence of an existing matrix;

the header vehicle initializing a new matrix based on the stored information of the header vehicle, when the existing matrix is not present;

the header vehicle estimating travel time on the road segments based on the new matrix when the existing matrix is not present or based on the existing matrix when the existing matrix is present;

the header vehicle computing a backlog indicator based on the travel time on the road segments and each route request from all vehicles;

the header vehicle updating the new matrix when the existing matrix is not present or updating the existing matrix when the existing matrix is present, wherein the updating is based on the backlog indicator;

the header vehicle generating a route and assigning a route to neighboring vehicles based on the updated matrix; and the header vehicle broadcasting the updated matrix.

9. The computer readable medium according to claim 8, wherein the program of instructions further causes the computer system to assign the route to at least one neighboring vehicle.

10. The computer readable medium according to claim 8, wherein the program of instructions further causes the computer system to obtain data associated with a location of the junction at each junction.

11. The computer readable medium according to claim 8, wherein the step of selecting is performed based on a random countdown timer and a vehicle ID.

12. The computer readable medium according to claim 8, wherein the step of broadcasting the destination address as a route request is performed periodically.

13. The computer readable medium according to claim 8, wherein the step of broadcasting the updated matrix at the header vehicle is performed at periodic intervals until the header vehicle arrives at a different junction.

14. The computer readable medium according to claim 8, wherein the program of instructions further causes the computer system to perform the steps of: at each vehicle leaving the vehicular network, broadcasting an exit message.

* * * * *